US010275273B2

(12) United States Patent
Sevinc (10) Patent No.: US 10,275,273 B2
(45) Date of Patent: Apr. 30, 2019

(54) EFFICIENT COMPUTATION OF ADDRESS GROUPINGS ACROSS MULTIPLE NETWORK INTERFACES

(71) Applicant: Nicira, Inc., Palo Alto, CA (US)

(72) Inventor: Soner Sevinc, San Francisco, CA (US)

(73) Assignee: Nicira, Inc., Palo Alto, CA (US)

( * ) Notice: Subject to any disclaimer, the term of this patent is extended or adjusted under 35 U.S.C. 154(b) by 168 days.

(21) Appl. No.: 15/338,155

(22) Filed: Oct. 28, 2016

(65) Prior Publication Data

US 2018/0124112 A1    May 3, 2018

(51) Int. Cl.
*G06F 21/00*    (2013.01)
*G06F 9/455*    (2018.01)
*H04L 29/06*    (2006.01)

(52) U.S. Cl.
CPC ...... *G06F 9/45558* (2013.01); *H04L 63/0263* (2013.01); *G06F 2009/45595* (2013.01)

(58) Field of Classification Search
CPC . H04L 63/20; H04L 63/0236; G06F 9/45558; G06F 2009/45591; G06F 2009/45587; G06F 2009/45595
See application file for complete search history.

(56) References Cited

U.S. PATENT DOCUMENTS

| 7,571,463 | B1 * | 8/2009 | Fedyk | H04L 63/065 |
| | | | | 726/3 |
| 7,873,997 | B2 * | 1/2011 | Belenky | H04L 63/1441 |
| | | | | 726/22 |
| 2002/0196773 | A1 * | 12/2002 | Berman | H04L 12/4637 |
| | | | | 370/351 |
| 2012/0066410 | A1 * | 3/2012 | Stefanakis | H04L 45/00 |
| | | | | 709/245 |
| 2016/0234112 | A1 * | 8/2016 | Anand | H04L 45/00 |
| 2017/0180240 | A1 * | 6/2017 | Kern | H04L 45/02 |

* cited by examiner

*Primary Examiner* — Mahfuzur Rahman
(74) *Attorney, Agent, or Firm* — Patterson + Sheridan, LLP (57) ABSTRACT

Certain embodiments described herein are generally directed to normalizing service rules across multiple virtual interfaces (VIFs). For example, certain embodiments described herein relate to a method for managing service rules. The method may include receiving a plurality of service rules for a set of VIFs, wherein each service rule corresponds to at least one network address and grouping the network addresses into non-overlapping groups of network addresses, wherein the grouping is performed over the service rules corresponding to the set of VIFs. In certain embodiments, flow entries may be generated based on the grouping of the network addresses.

20 Claims, 3 Drawing Sheets

EFFICIENT COMPUTATION OF ADDRESS GROUPINGS ACROSS MULTIPLE NETWORK INTERFACES

BACKGROUND

In computing, a firewall is a network security system that monitors and controls the incoming and outgoing network traffic (e.g., packets) based on predetermined security rules. A firewall often establishes a barrier between a trusted, secure network and external networks that are assumed not to be secure or trusted. Firewalls may be programmed with many rules specifying which packets to allow or drop, such as based on a network address associated with the packet (e.g., Internet protocol (IP) address of a source or destination of the packet).

A tenant in a software defined data center with virtualized networking may also want firewall services, which could be implemented in a distributed manner. Doing so may require the implementation of many firewall rules throughout the logical network in an efficient manner. As such, various optimizations are desirable to provide such firewall rules efficiently.

BRIEF SUMMARY

Herein described are one or more embodiments of a method for managing service rules. The method generally includes receiving a plurality of service rules for a set of virtual interfaces (VIFs), wherein each service rule corresponds to at least one network address. The method also includes grouping the network addresses into non-overlapping groups of network addresses, wherein the grouping is performed over the service rules corresponding to the set of VIFs, and generating flow entries based on the grouping of the network addresses.

Also described herein are embodiments of a computer-readable medium having instructions stored thereon for performing the method described above for managing service rules.

Also described herein is an apparatus for managing service rules. The apparatus generally includes means for performing the method described above for managing service rules.

The preceding Summary is intended to serve as a brief introduction to some embodiments of the invention. It is not meant to be an introduction or overview of all subject matter disclosed in this document. The Detailed Description that follows and the Drawings that are referred to in the Detailed Description will further describe the embodiments described in the Summary as well as other embodiments. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description, numerous details, examples, and embodiments are set forth and described. Certain embodiments described herein relate to techniques for generating configuration data for a flow-based managed forwarding element (MFE) in order for the MFE to implement distributed service rules (e.g., distributed firewall rules). An MFE is a managed virtual switch that connects virtual machines (or other virtual computing instances) residing on a physical host computer to each other and the outside world. In certain embodiments, the MFE may forward packets to a virtual interface (VIF), a tunnel endpoint, or a broadcast medium (such as for virtual local area networks). For example, for virtual machines residing on logical overlay networks, which are network abstractions implemented using network tunneling protocols, the MFE ensures egress packets are properly encapsulated and forwarded to the correct tunnel endpoint and ingress packets are decapsulated and forwarded to the correct virtual machine.

Each MFE may manage service rules for a plurality of virtual interfaces (VIFs) that provide connections between the MFE and the virtual machines of the host. Virtual machines, MFEs, and VIFs running on the host may be implemented by a hypervisor. If the host runs containers or another form of virtualized computing instances, the MFEs, VIFs, etc., may be implemented and managed by the host operating system. In some embodiments, a local control plane instance (e.g., implemented by the hypervisor on the host) (or other controller entity running on the same host or remote from the host) may receive distributed service rules corresponding to multiple VIFs, and generate configuration data (e.g., flow entries) for the service rules. Generating the configuration data may include identifying non-overlapping sets of network addresses (e.g., IP addresses) that are treated similarly by the rules and generating the configuration data in terms of these non-overlapping address sets rather than the address sets for which the rules are written. This enables the network controller to reduce the number of flow entries that it pushes to the MFE to implement the distributed service rules. Certain embodiments described herein identify the non-overlapping sets of addresses over the service rules that are applied to multiple VIFs, as opposed to a single VIF.

Figure 1:
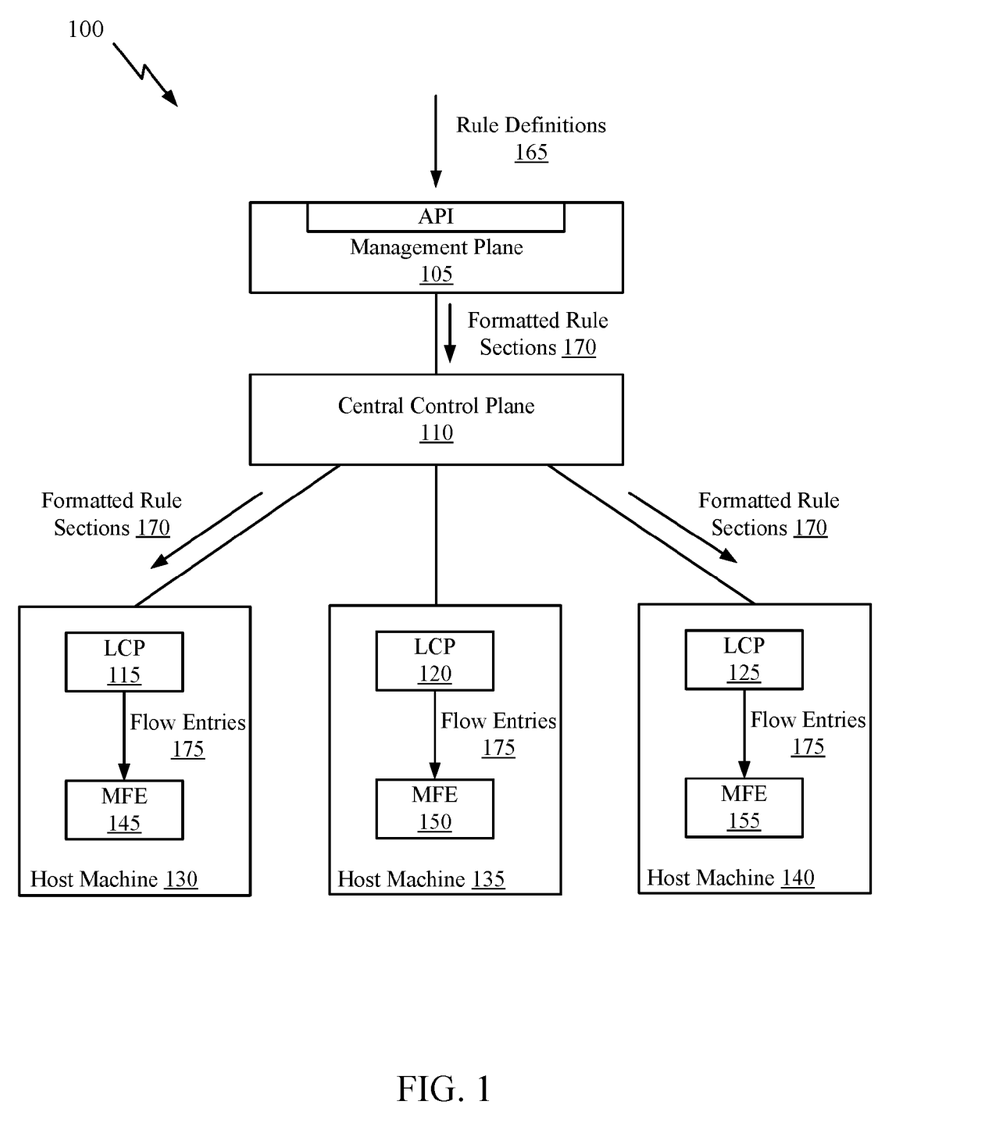
FIG. 1 illustrates a network control system, in accordance with certain embodiments described herein.

FIG. 1 illustrates a network control system 100, in accordance with certain embodiments described herein. Network control system 100 includes a management plane 105, a central control plane 110, and multiple local controllers (also called the local control plane (LCP)) 115-125 that operate on host machines 130-140. In addition, each of host machines 130-140 includes one or more managed forwarding elements (MFE) 145-155 (only one shown for each host) that processes data traffic according to configuration information received from their respective local controllers ("LCP" for local control plane instance) 115-125. For example, each of MFEs 145-155 may manage service rules for a plurality of VIFs on respective host machines 130-140. In some embodiments, each host machine 130-140 runs a hypervisor that implements the MFEs and local controllers on the host machine.

Though shown as single entities, it should be understood that both management plane 105 and central control plane 110 may be implemented as distributed or clustered systems. That is, management plane 105 may include multiple computers that implement management plane functions, and central control plane 110 may include multiple controller computers or virtual machines or containers (or other logical compute instances) that implement central control plane functions. In some embodiments, each such controller includes both management plane and central control plane functions (e.g., as separate applications or functions).

Management plane 105 of some embodiments is responsible for receiving logical network configuration inputs through an application programming interface (API) 160. Users may further input logical network configuration data through, e.g., a command-line interface, a graphical user interface such as a web interface, etc. In some embodiments, the network control system manages MFEs in a datacenter or other physical network that is virtualized, with numerous logical networks (for, e.g., numerous different applications and/or tenants) all implemented on the same physical infrastructure. Each logical network configuration, in some embodiments, may include configuration data defining one or more logical forwarding elements, such as logical switches, logical routers, etc. This configuration data may include information describing the logical ports (e.g., assigning MAC and/or IP addresses to logical ports) for these logical forwarding elements, how the logical forwarding elements interconnect, etc. In addition, logical network configuration data may include service rule definitions 165, such as distributed firewall rules, for the logical network.

Management plane 105 receives this logical network configuration data and generates desired state data that specifies how the logical network should be implemented in the physical infrastructure. In some embodiments, this data includes descriptions of the logical forwarding elements in a uniform format (e.g., as a set of database records, or a different format). Management plane 105 of some embodiments is responsible for translating API calls (e.g., to create, update, or delete) into modifications to the desired state, and for sending this desired state to central control plane 110.

As illustrated, this desired state data may include formatted rule sections 170 for the service rules. In some embodiments, the service rules are organized in sets based on different characteristics. For instance, in some embodiments the network administrator that defines the service rules also defines how the rules are organized. As examples, the rules might be organized with all layer 2 (L2) rules in a first set and all layer 3 (L3) rules in a second set, or with separate sets for each logical L2 switch and each logical L3 router. Other forms of organization, such as all http-related rules in one set and all ssh-related rules in another set, may be used as well. These sets of service rules (also referred to as rule sections) may be organized with priorities, from a highest-priority rule section to a lowest-priority rule section. In addition, within each rule section, the service rules themselves may be organized from a highest-priority rule to a lowest-priority rule.

Central control plane 110 of some embodiments receives the desired state and is responsible for pushing that desired state to the appropriate host machines (that will realize this state). In some embodiments, each logical network is implemented on a subset of the physical infrastructure (e.g., a subset of the managed forwarding elements operating on host machines of the physical infrastructure). For example, if virtual machines that connect through a particular logical network reside on five of ten host machines, then some embodiments only implement the logical network on those five host machines. Central control plane 110 may send the state data for that logical network to local controllers operating on these host machines. As illustrated, this may include sending formatted rule sections 170 to local controllers 115 and 125, but not to local controller 120 as host machine 135 may not host any VMs that connect to this logical network, and thus its MFE 150 may not need to implement these rules.

Local controllers 115-125 may be responsible for translating formatted rule sections into configuration data formatted for the MFE operating on their respective hosts. In some embodiments, the local controller is a daemon that operates in or on behalf of the virtualization software of the host machine, as does the MFE. In other embodiments, the local controller and MFE may operate within an operating system that hosts multiple containers for one or more logical networks. Where a VM hosts multiple containers, a first local controller and MFE operate in the virtualization software on the host machine while a second local controller and MFE operate in the container host (or multiple such controllers/MFE operate in multiple container host VMs).

In addition, while in some embodiments all MFEs in the physical infrastructure are of the same type (and thus require data in the same format), in other embodiments the physical infrastructure may include multiple different types of MFEs. For instance, some embodiments include both hosts with kernel virtual machine (KVM) virtualization software with a flow-based MFE (e.g., Open vSwitch) and hosts with ESX virtualization software with a feature-based MFEs. Such different types of MFEs may use different data formats from the local controller. In the example of FIG. 1, the local controllers 115 and 125 both manage flow-based MFEs 145 and 155, and thus these local controllers generate flow entries 175 for distribution to the MFEs. These flow entries are generated for the service rule sections 170 in such a way as to (i) reduce the number of flow entries for service rules and (ii) reduce the amount of churn in the flow entries caused by changes to the service rules.

Figure 2:
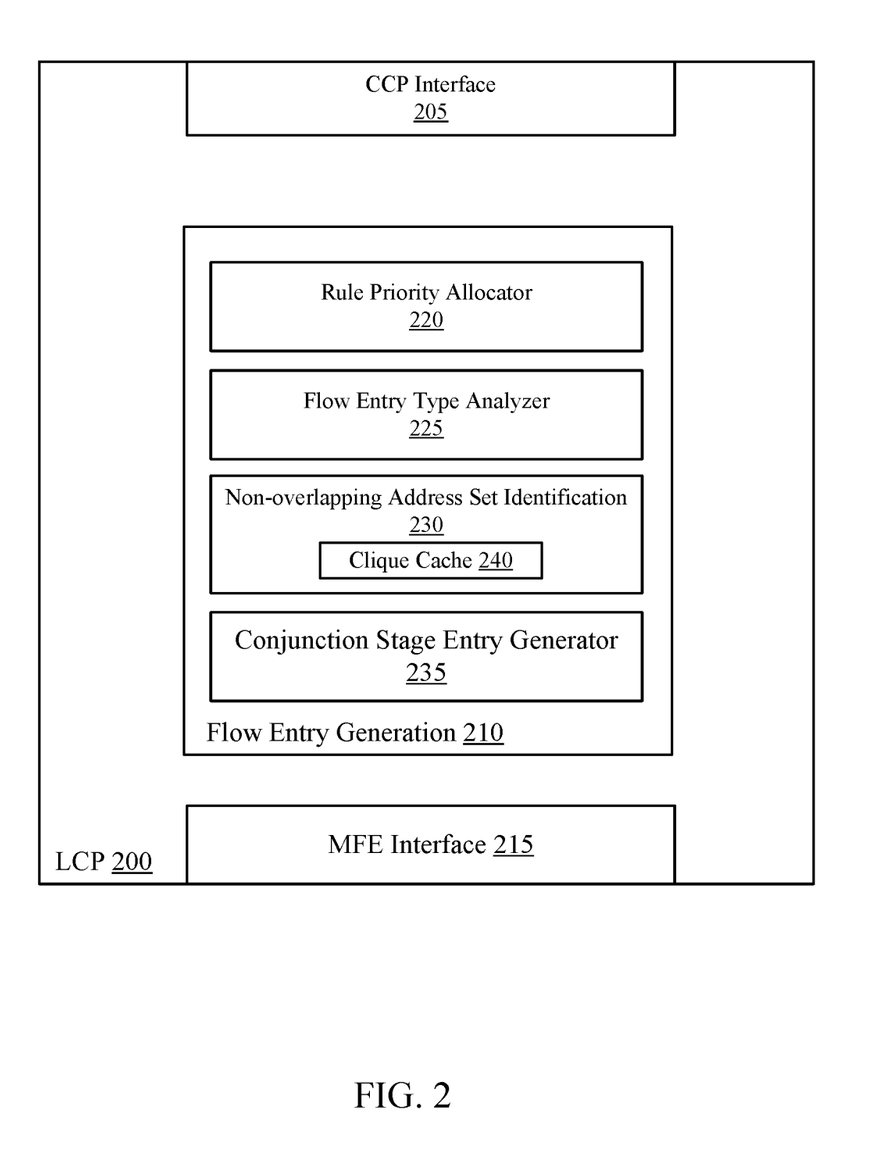
FIG. 2 illustrates the architecture of a local controller, in accordance with certain embodiments described herein.

FIG. 2 conceptually illustrates the architecture of a local controller 200 that manages a flow-based MFE, in accordance with certain embodiments described herein. It should be understood that this diagram may not include all features of such a local controller, but instead relates specifically to those modules that perform functions related to generating flow entries for service rules to be implemented by the MFE. As shown, local controller 200 includes a central control plane interface 205, a flow entry generator 210, and a managed forwarding element interface 215. Central control plane (CCP) interface 205 receives logical network configuration data, including service rule data, from one or more central controllers. For example, different central controllers may handle the data for different logical networks, and in the case of controller failure new controllers may take over responsibility from the failed controller.

MFE interface 215 handles interactions with the MFE on the local host (e.g., in the virtualization software). That is, the data generated by the local controller is pushed to the MFE via this interface 215, based on the type of MFE instantiated on the host. In addition, MFE interface 215 receives data from the MFE (e.g., physical port numbers, etc.) which the local controller may use to calculate additional configuration data for the MFE (e.g., flow entries) in addition to passing the data up to the central control plane via CCP interface 205.

Flow entry generator 210 generates configuration data (flow entries, in this case) for the MFE. While flow entry generator 210 may include various functions, this figure illustrates certain modules related to the efficient generation of flow entries for service rules, such as distributed firewall rules. Specifically, flow entry generator 210 includes a rule priority allocator 220, a flow entry type analyzer 225, a non-overlapping address set identification module 230, and a conjunction stage flow entry generator 235.

In certain embodiments, to accommodate the structure of the flow-based MFEs of some embodiments, priority allocator 220 may flatten the received rule sections into a single list from a highest-priority service rule to a lowest-priority service rule. The priority allocator 220 may start with the highest-priority rule section, and assign those service rules the highest priorities, then proceeds to the next-highest-priority rule section and assign those service rules the next highest priorities, and so on through the lowest-priority rule section, with the lowest priority assigned to the lowest-priority service rule in the lowest-priority rule section.

However, simply flattening the priorities into a single list from 1-N may create substantial churn when new service rules are added. For instance, if the rules were organized from priority 1 (highest-priority rule) to priority 1000 and a new service rule was added between the priority 10 and priority 11 service rules, then the priorities of the service rules from 11-1000 would need to be modified. This would use significant network controller resources, in addition to causing substantial transaction resources and time to change all of the flow entries at the MFE.

Instead, priority allocator 220 of some embodiments assigns the priority values in a manner designed to reduce re-assignment of priorities when changes are received to the service rules. This is complicated by the MFEs of some embodiments having a constrained space for priority assignment. For example, some MFEs have a 16-bit allocation for flow entry priority values, and thus the service rules for a particular logical network can have a maximum of 65,536 different priorities. Some embodiments divide the priority space into three contiguous subsets, with the highest and lowest priority values (e.g., 1000 highest and 1000 lowest) left unassigned initially. Within the middle subset, the network controller spaces the service rules when assigning priority values. For example, if the middle subset has 10000 possible priority values and there are 500 service rules, some embodiments assign every $20^{th}$ priority value to a service rule. Other embodiments may use two different spacing values, with a smaller spacing left between service rules within the same rule section and a larger spacing left between the lowest-priority service rule of a first rule section and the highest-priority service rule of the next rule section. This latter option allows for flexibility if rules are added/changed/removed within a rule section, while also providing for additional flexibility if rules are added at the beginning or end of a rule section or if a completely new rule section is added in between two previously-existing rule sections.

When local controller 200 receives new service rules (e.g., based on changes made by a network administrator), priority allocator 220 identifies the location in the list for the new rules, and assigns priority values while minimizing the number of other rules affected by the change. Thus, for example, if a single new rule is added between a first service rule assigned to priority X and a second service rule assigned to priority X+20, then the new rule may be assigned to priority X+10. In a more complicated case, if fifteen new rules are added in between a rule with priority X and a rule with priority X+10, then clearly the priority values for some of the rules will need to be changed. For example, if the rule with a next highest priority than priority X (i.e., lower priority value) is X−10, but the rules with the next lowest priorities after priority X+10 have priorities of X+11, X+12, and X+13, then it may affect fewer rules to move the priority X rule to priority X−6 and fit the new rules between priority X−6 and priority X+10. Some embodiments account for additional factors, such as the number of flow entries used to implement each rule, with a preference for modifying the priorities of rules that have fewer corresponding flow entries.

Once priority allocator 220 assigns priority values to the service rules, the other modules of the configuration data generator then generate configuration data for the MFE (e.g., flow entries, for a flow-based MFE). In the MFE of some embodiments, flow entries within a table (or sub-table) have priorities, such that if a packet matches more than one flow entry in a stage, the MFE may execute the actions of the highest-priority matching flow entry on the packet. Some embodiments use a single stage of flow entries for the service rules (e.g., with one flow entry per service rule), while other embodiments use multiple stages of flow entries.

Specifically, in some embodiments, the service rules include matches over multiple parameters (e.g., source (src) network address (e.g., media access control (MAC) or internet protocol (IP) address), destination (dst) network address, source transport layer port, and destination transport layer port) and the service rules may correspond to different VIFs. While a service rule can match over a single value for each parameter or multiple values for one or more of the parameters, the MFEs may use flow entries with a single value for each parameter. Thus, multiple flow entries may be used for service rules with multiple possible values for each parameter. As a simple example, a service rule with two possible values for a first parameter and one value for each of the other parameters may use two flow entries. For example, Rule 1 may include src addresses of {.1, .2} and a dst address of {.3}, which may be processed using two flow entries.

However, for service rules with large numbers of possible parameter values, this can lead to a massive number of flow entries. If a service rule has five possible source addresses, seven possible destination addresses, fifty possible source ports, and twenty-five possible destination ports, then simply taking the product of these parameters leads to 5*7*50*25=43,750 flow entries for a single service rule. In some cases, to solve this problem, a conjunctive matching technique may be used that allows a packet to be conjunctively matched across multiple parameters. In this case, a conjunction action ties groups of individual flows into higher level "conjunctive flows." Each group corresponds to one dimension (e.g., one of source address, destination address, source port, destination port, etc.), and each flow within the group matches one possible value for the dimension. A packet that matches one flow from each group matches the conjunctive flow. According, one flow entry is added for each possible value of each dimension corresponding to a conjunction identifier of the higher level conjunctive flow and a value corresponding to the flow's dimension. Thus, the number of flow entries is equal to the number of unique parameter values across each of the dimensions. In the example above, this would only require 5+7+50+25+1=88 flow entries, a significant savings. Thus, the flow entry type analyzer 225 may identify, for each service rule, whether to implement the service rule using a single stage of flow entries or whether to use a conjunctive match technique that may use multiple stages of flow entries. In some embodiments, if at least two of the parameters of the service rule include two or more possible values, then the local controller will use the conjunctive matching technique.

In some embodiments, non-overlapping address set identification module 230 uses address set normalization to further simplify the set of flow entries to push to the MFE. Address set normalization, for each of the source and destination address parameters, identifies sets of addresses that are treated the same within all of the service rules, and groups these sets into non-overlapping groups that are each treated the same within the flow entries. For instance, if two source addresses are matched by the same five service rules, then these addresses can be assigned an identifier. Before the packet processing stage for matching source addresses, a packet may be processed through a stage that matches its source address to a group identifier, which the MFE matches over at the source address processing stage rather than matching over the actual addresses.

For example, the network controller may receive a group of service rules for implementation by the MFE, with each service rule matching over a set of addresses (e.g., a source address and a destination address). For each of the source and destination addresses, these groups may be partially overlapping. For instance, rule A might match over the set of addresses {K, L, M}, while rule B matches over the set of addresses {K, L, N}. In this case, the network controller would flatten these addresses, then identify three groups of addresses: {K, L} (for both service rules), {M} (for service rule A), and {N} (for service rule B). Thus, the first stage of packet processing relevant to these rules would assign a first group identifier to packets with address K or L, a second group identifier to packets with address M, and a third group identifier to packets with address N.

As another example, non-overlapping address set identification module 230 may receive the following service rules:

Rule1: src={.1, .2, .3, .4, .5, .6, .7, .8} dst={.5, .6, .7, .8, .9, .10, .11, .12}

Rule2: src={.1, .2, .3, .4, .9, .10, .11, .12} dst={.9, .10, .11, .12}

Each of addresses .1 to .12 corresponds to one or more network addresses (e.g., IP addresses). Non-overlapping address set identification module 230 may determine non-overlapping address groups for Rule 1 and Rule 2. The non-overlapping address groups may include {.1, .2, .3, .4} from src addresses of Rule 1 and Rule 2, {.5, .6, .7, .8} for src and dst addresses of Rule 1, and {.9, .10, .11, .12} from the src and dst addresses of Rule 1 and Rule 2. Then, non-overlapping address set identifier module 230 may assign an identifier to each of the non-overlapping address groups. For example, non-overlapping address set identification module 230 may assign identifier 1 to the address group {.1, .2, .3, .4}, assign identifier 2 to the addresses group {.5, .6, .7, .8}, and may assign identifier 3 to address group {.9, .10, .11, .12}. Thus, Rule 1 and Rule 2 may be reduced to:

Rule1: src={1, 2} dst={2, 3}
Rule2: src={1, 3} dst={3}

Based on this grouping, the total number of flow entries corresponding to Rule 1 and Rule 2 can be reduced. For example, the total number of flow entries based on this grouping may be equal to 18 flow entries (e.g., 12 flow entries for encoding mappings as the rules include 12 different addresses+4 flow entries to realize Rule 1+2 flow entries to realize Rule2). In particular, the number of flows to implement a Rule may be the lesser of the sum of the number of source addresses and destination addresses or the product of the number of source addresses and the number of destination addresses. The number of flow entries for encoding mappings may be equal to the sum of the number of addresses corresponding to each identifier. However, without the address grouping, the total number of flow entries would be equal to 28. Thus, by grouping the addresses, the total number of flow entries is reduced by 1. In certain embodiments described herein, the non-overlapping address set identification module 230 may perform the address set normalization over service rules corresponding to multiple VIFs to further reduce the number of flow entries, as will be described in more detail herein. For example, in certain embodiments, the grouping of network addresses may be performed over service rules corresponding to multiple VIFs. In this case, the non-overlapping address set identification module 230 may include a clique cache 240 that maintains groupings of VIFs that can be combined by the non-overlapping address set identification module 230 in order to reduce the total number of flow entries, as will be discussed in more detail herein.

In certain embodiments, conjunction stage flow entry generator 235 generates the staged flow entries once address set normalization has been performed. Conjunction stage flow entry generator 235 generates flow entries for assigning identifiers to packets based on the source and/or destination addresses, as well as the conjunction stages that match each parameter and a final stage for determining whether all of the conditions are met for any particular rule. In some embodiments, the non-conjunctive (single stage) flow entries are generated using the normalized address sets as well.

Once the network controller assigns priority values to the rules, the controller then generates the configuration data for the MFE. For a flow-based MFE, this configuration data is flow entries used by the MFE to implement the service rules (as well as other aspects of the logical network). In the MFE of some embodiments, flow entries within a table (or sub-table) have priorities, such that if a packet matches more than one flow entry in a stage, the MFE may execute the actions of the highest-priority matching flow entry on the packet (thus the assignment of flattened priority values to the rules). Some embodiments use a single stage of flow entries for the service rules (i.e., with one flow entry per service rule), while other embodiments use multiple stages of flow entries.

Example Computation of Address Groupings
Across Multiple Network Interfaces

As presented above, address set normalization identifies sets of addresses that are treated the same across multiple service rules, and groups these sets into non-overlapping groups that are each treated the same within the flow entries. For instance, if two source addresses are matched by the same five service rules, then these addresses can be assigned an identifier. Before the packet processing stage for matching source addresses, a packet may be processed through a stage that assigns the packet a group identifier based on its source address. The MFE then matches over this group identifier at the source address processing stage rather than matching over the actual address of the packet. In some cases, the non-overlapping address groups may be identified within the scope of multiple VIFs, as described in more detail herein.

Figure 3:
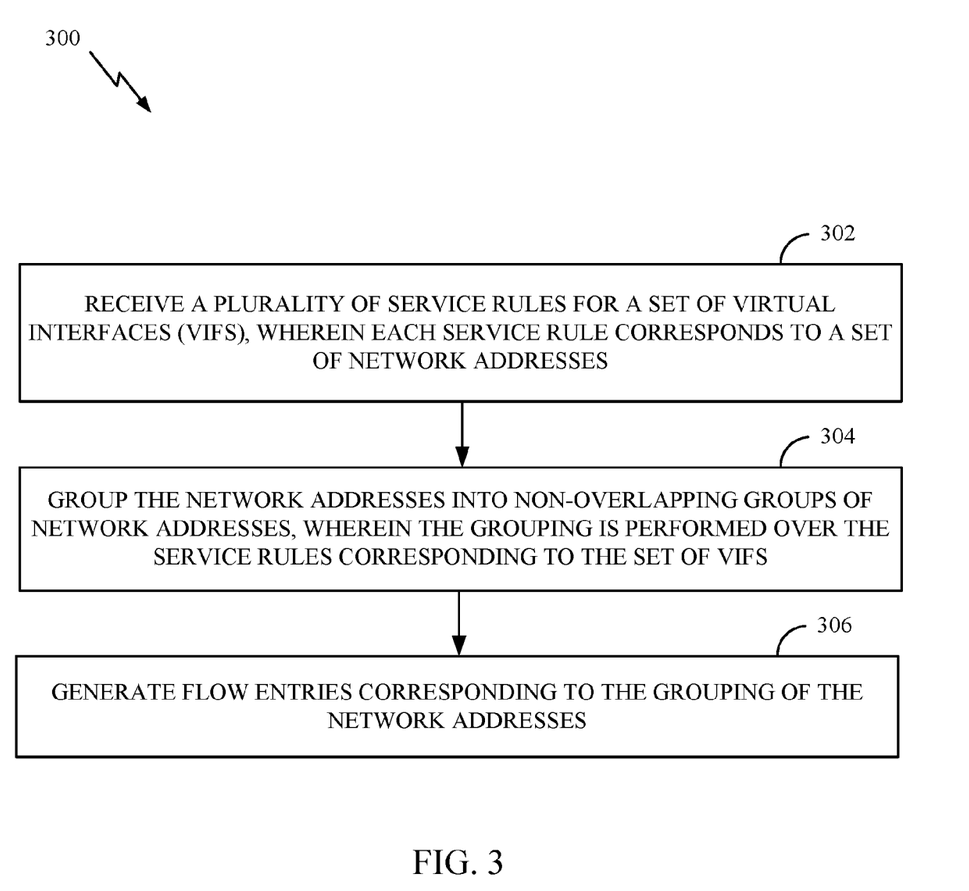
FIG. 3 is flow diagram of example operations for managing service rules, in accordance with certain embodiments described herein.

FIG. 3 is a flow diagram of example operations 300 for assigning addresses to non-overlapping groups, in accordance with certain embodiments described herein. In some embodiments, operations 300 may be performed by a network controller such as non-overlapping address set identification module 230 including clique cache 240.

The operations 300 begin, at block 302, by receiving a plurality of service rules for a set of virtual interfaces (VIFs), wherein each service rule corresponds to at least one network address. At block 304, non-overlapping address set identification module 230 groups the network addresses into non-overlapping groups of network addresses, wherein the grouping is performed over the service rules corresponding to the set of VIFs, and at block 306, generates flow entries based on the grouping of the network addresses.

To facilitate understanding of address set normalization over service rules of multiple VIFs, an example address set normalization for a single VIF is first provided. For example, with respect to a first VIF (VIF1), non-overlapping address set identification module 230 may receive the following service rules:

Rule1: src={.1, .2, .3, .4, .5, .6, .7, .8} dst={.5, .6, .7, .8, .9, .10, .11, .12}

Rule2: src={.1, .2, .3, .4, .9, .10, .11, .12} dst={.9, .10, .11, .12}

Non-overlapping address set identification module 230 may implement an address-grouping algorithm mapping the groups of addresses to integer group IDs, scoped within the VIF. For example, addresses {.1, .2, .3, .4} may be mapped to integer 1, addresses {.5, .6, .7, .8} may be mapped to integer 2, and addresses {.9, .10, .11, .12} may be mapped to integer 3. Thus, Rule 1 and Rule 2 may be reduced to:

Rule1: src={1, 2} dst={2, 3}
Rule2: src={1, 3} dst={3}

The total number of flow entries based on this grouping may be equal to 18 flow entries (e.g., 12 flow entries for encoding mappings+4 flow entries to realize Rule 1+2 flow entries to realize Rule 2).

For a second VIF (VIF2), non-overlapping address set identification module 230 may receive the following service rules:

Rule3: src={.1, .2, .3, .4, .5, .6} dst={.7, .8, .9, .10, .11, .12}

Rule4: src={.7, .8, .9, .10, .11, .12} dst={.1, .2, .3, .4, .5, .6}

Thus, for VIF2, network addresses {.1, .2, .3, .4, .5, .6} may be mapped to integer 1, and network addresses {.7, .8, .9, .10, .11, .12} may be mapped to integer 2. Thus, Rule 3 and Rule 4 may be reduced to:

Rule3: src={1} dst={2}
Rule4: src={2} dst={1}

The total number of flow entries based on the grouping for VIF2 service rules may be equal to 14 flow entries (12 flow entries for encoding mapping+1 flow entry to realize Rule 3+1 flow entry to realize Rule 4). Thus, performing address grouping for VIF1 and VIF2 separately may result in a total of 32 flow entries (e.g., 18 flow entries for VIF1+14 flow entries for VIF2). However, performing the address groupings of VIF1 and VIF2 together may result in a reduction of the total number of flow entries.

As presented above, at block 302 of FIG. 3, non-overlapping address set identification module 230 may receive a plurality of service rules for a set of VIFs (e.g., the service rules for VIF1 and VIF2). Non-overlapping address set identification module 230 may determine the network address groups that are non-overlapping over the service rules of both VIF1 and VIF2. For example, the non-overlapping address groups may be {.1, .2, .3, .4}, {.5, .6}, {.7, .8}, {.9, .10, .11, .12}. Non-overlapping address set identification module 230 may identify each of the non-overlapping address groups of service rules of VIF1 and VIF2 based on a corresponding non-overlapping group of a respective VIF. For example, as discussed above, VIF1 has corresponding non-overlapping address identifiers 1, 2, and 3. Further, VIF2 has corresponding non-overlapping address identifiers 1 and 2. Accordingly, non-overlapping address set identification module 230 may identify the non-overlapping address groups of service rules of VIF1 and VIF2 by comparing the addresses that match between pairs (e.g., each possible pair) of sets of addresses (e.g., each Rule 1 set with identifiers 1, 2, and 3, respectively, and each Rule 2 set with identifiers 1 and 2, respectively). For example, the non-overlapping address groups each may be identified as G1_G2, where G1 may be the identifier of a non-overlapping address group of VIF1 (e.g., with identifier 1, 2, or 3) and G2 may be the identifier of a non-overlapping address group of VIF2 (e.g., with identifier 1 or 2). For any network addresses that are not identified as a match between identifiers of both VIFs, the non-overlapping address set identification module 230 may identify those network addresses with a grouping identifier with G1 or G2 as "0." For example, having G1 as "0" indicates the addresses are from a group identifier of only one VIF (e.g., G2 that is not 0) and are not in the other VIF (G1 that is 0). Thus, the non-overlapping network address groups may be assigned identifiers as follows:

the network address grouping {.1, .2, .3, .4} may be identified by 1_1;
the network address grouping {.5, .6} may be identified by 2_1;
the network address grouping {.7, .8} may be identified by 2_2; and
the network address grouping {.9, .10, .11, .12} may be identified by 3_2.

It should be noted that 1_2 and 3_1 are not included because there is no overlap between the network addresses of those identifiers. Per this grouping, the rules can be reduced to:

Rule1: src={1_1, 2_1, 2_2} dst={2_1, 2_2, 3_2}
Rule2: src={1_1, 3_2} dst={3_2}
Rule3: src={1_1, 2_1} dst={2_2, 3_2}
Rule4: src={2_2, 3_2} dst={1_1, 2_1}

The flow entry count based on the merger of VIF1 and VIF2 may be equal to 28 flow entries (e.g., 12 for encoding mapping+6 to realize Rule 1+2 to realize Rule 2+4 to realize Rule 3+4 to realize Rule 4). This is a fewer number of flow entries than the 32 flow entries that would otherwise be used if the network address grouping was performed separately for VIF1 and VIF2. In other words, the profitability of merging VIF1 and VIF2 may be 4 flow entries (e.g., 32 flow entries minus 28 flow entries). Since the profitability for merging VIFs can be calculated in a respectively small amount of time, the above calculations may be performed to check whether it would be profitable to merge VIF1 with other VIF (e.g., VIF3, VIF4, and so on). In some cases, clique cache 240, based on the merger profitability calculation, may maintain a list of VIF cliques that provides an ordered list of the most profitable mergers of VIFs. Thus, non-overlapping address set identification module 230 can select from the most profitable VIFs for merger, based on the list of VIF cliques.

However, it should be noted that not all VIF mergers are profitable. For example, while merger of VIF1 and VIF2 may be profitable, that may not be the case for merger of VIF1 with a third VIF (VIF3), if the service rules for VIF3 are as follows:

Rule5: src={.1, .5, .9} dst={.2, .6, .10}
Rule6: src={.1, .2, .5, .6, .9, .10} dst={.1, .5, .9}

Non-overlapping network addresses corresponding to Rule 5 and Rule 6 may be {.1, .5, .9} and {.2, .6, .10}. Non-overlapping address set identification module 230 may identify network addresses {.1, .5, .9} by integer 1 and network addresses {.2, .6, .10} maybe be identified by integer 2. Thus, Rule 5 and Rule 6 may be reduced to:

Rule5: src={1} dst={2}
Rule6: src={1, 2} dst={1}

Based on this mapping, the total number of flow entries for VIF3 may be 9 (6 flow entries for encoding mappings+1 flow entry to realize Rule 5+2 flow entries to realize Rule 6).

On the other hand, if the grouping of network addresses was performed over the rules corresponding to both VIF1 and VIF3, the non-overlapping network address groupings would be {.1}, {.2}, {.3, .4}, {.5}, {.6}, {.7, .8}, {.9}, {.10}, {.11, .12}. As shown, due to the few number of overlapping addresses between the rules of VIF1 and VIF3, the number of non-overlapping groups is higher (e.g., as compared to the merger of VIF1 and VIF2). The non-overlapping address set identification module 230 may assign identifiers to the network address groupings as follows:

the network address groupings {.1} may be identified by 1_1;
the network address grouping {.2} may be identified by 1_2;
the network address grouping {.3, .4} may be identified by 1_0;
the network address grouping {.5} may be identified by 2_1;
the network address grouping {.6} may be identified by 2_2;
the network address grouping {.7, .8} may be identified by 2_0;
the network address grouping {.9} may be identified by 3_1;
the network address grouping {.10} may be identified by 3_2; and
the network address grouping {.11, .12} may be identified by 3_0.

Thus, based on this grouping, Rule 1, Rule 2, Rule 5, and Rule 6 may be reduced to:

Rule1: src={1_1, 1_2, 1_0, 2_1, 2_2, 2_0} dst={2_1, 2_2, 2_0, 3_1, 3_2, 3_0}
Rule2: src={1_1, 1_2, 1_0} dst={3_1, 3_2, 3_0}
Rule5: src={1_1, 2_1, 3_1} dst={1_2, 2_2, 3_2}
Rule6: src={1_1, 2_1, 3_1, 1_2, 2_2, 3_2} dst={1_1, 2_1, 3_1}

Thus, the number of flow entries for the merger of VIF1 and VIF3 may be equal to 45 flow entries (12 for encoding mappings+12 flow entries to realize Rule 1+6 flow entries to realize Rule 2+6 flow entries to realize Rule 5+9 flow entries to realize Rule 6). However, if the network address groupings were obtained over VIF1 and VIF3 separately, the total number of flow entries would be 18 flow entries for VIF1+9 flow entries for VIF3 for a total of 27 flow entries. Thus, the merger of VIF1 and VIF3 is not profitable.

There may be many VIFs in a hypervisor or host machine, making it difficult to calculate merger profitability for all combination of VIFs. Thus, in certain embodiments described herein, the non-overlapping address set identification module 230 may implement a form of greedy heuristic algorithm to perform profitable mergers of VIFs. For example, non-overlapping address set identification module 230 may merge VIFs into cliques, which can be used to form further mergers of VIFs to form bigger cliques. For example, as presented herein, non-overlapping address set identification module 230 may determine that the merger of VIF1 and VIF2 provides a merger profit of 4 flow entries. Let's assume for the sake of example that VIF1 and another VIF (VIF8) provide a merger profit of 2. Then, non-overlapping address set identification module 230 may determine to merge VIF1 with VIF2 first, because that merger of VIF1 and VIF2 is more profitable. Moreover, non-overlapping address set identification module 230 may now determine whether VIF1 and VIF2 merge well (e.g., provide a positive profit margin) with another VIF (e.g., VIF8). It should be noted that the merger sequence might matter in that just because VIF1 and VIF2 merge well and VIF1 and VIF8 merge well, that does not mean that VIF2 merges well with VIF8.

Since there are an exponential number of different groupings based on the number of VIFs, it may be difficult to try all possible combinations. Therefore, non-overlapping address set identification module 230 may keep a cache (e.g., clique cache 240) of profitable pairwise mergers of a certain size (e.g., predetermined), and pick the most profitable VIFs for merger. When no more profitable mergers are left in the clique cache 240, the greedy heuristic algorithm ends, and the generated cliques are declared.

For example, clique cache 240 may have a cache size of four potential mergers, and there may be a total of 10 VIFs. Non-overlapping address set identification module 230 may test pairs of VIFs (e.g., sequentially, or by some other heuristic method) to see if there is a profitable merger for the VIF pair. For example, non-overlapping address set identification module 230 may test VIF1 and VIF2, and determine that there is a profitable merger of four for VIF1 and VIF2. Since non-overlapping address set identification module 230 determines that the merger of VIF1 and VIF2 is profitable, non-overlapping address set identification module 230 may put an entry in the clique cache 240 indicating VIF1, VIF2 and the merger profit of 4. Next, non-overlapping address set identification module 230 may test VIF3 and VIF4, and may determine that there no profitable merger for VIF3 and VIF4. Therefore, non-overlapping address set identification module 230 does not put an entry in the clique cache 240 for a merger of VIF3 and VIF4. Continuing, non-overlapping address set identification module 230 may test VIF5 and VIF6 and determine a merger profit of 10, and enter the information in clique cache 240. Non-overlapping address set identification module 230 may similarly find and create entries for VIF7 and VIF8 with a merger profit 12, and VIF9 and VIF10 with a merger profit of 2. Once the entry of VIF9 and VIF10 are added, clique cache 240 is full as it includes 4 potential merger entries. Non-overlapping address set identification module 230 then determines which entry has the highest merger profit, which in this case would be VIF7 and VIF8. Non-overlapping address set identification module 230 then performs the merger, such that a first clique (VIF7+VIF8) is formed. Non-overlapping address set identification module 230 may then empty clique cache 240, or may reuse the existing computed mergers to save time, and again start testing pairs of VIFs, where any clique formed is treated as a single VIF for the sake of testing merger profitability. The algorithm may continue until no more profitable mergers are found, or in certain embodiments, may continue for a finite time period or some other heuristically determined duration.

Certain embodiments described herein may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While certain embodiments described herein have been described with reference to numerous specific details, one of ordinary skill in the art will recognize that the invention can be embodied in other specific forms without departing from the spirit of the invention. The operations of FIG. 3 may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

I claim:

1. A method for managing service rules, comprising:
receiving a plurality of service rules for a set of virtual interfaces (VIFs) comprising a plurality of VIFs, wherein each service rule corresponds to at least one network address;
grouping the network addresses into non-overlapping groups of network addresses, wherein the grouping is performed over the plurality of service rules corresponding to the set of VIFs;
mapping the network addresses to the non-overlapping groups in a first data structure;
generating a set of flow entries corresponding to the plurality of service rules based on the non-overlapping groups;
receiving a packet comprising a first network address;
based on the first data structure, identifying a first non-overlapping group associated with the first network address;
based on the set of flow entries, determining a first service rule to apply to the packet based on the identified first non-overlapping group; and
applying the first service rule to the packet.

2. The method of claim 1, wherein the set of VIFs comprise a first VIF and a second VIF, wherein the grouping is performed over the services rules corresponding to the first VIF and the second VIF.

3. The method of claim 1, further comprising:
performing another grouping of the network addresses into non-overlapping groups of network addresses, wherein the other grouping is performed over the service rules corresponding to each of the set of VIFs; and
comparing a total number of flow entries corresponding to the other grouping of network addresses to a total number of flow entries corresponding to the grouping of network addresses, wherein the flow entries are generated based on the comparison.

4. The method of claim 3, wherein generating the flow entries based on the comparison comprises:
generating the flow entries based on the grouping of network addresses if the total number of flow entries corresponding to the grouping is less than the total number of flow entries corresponding to the other grouping.

5. The method of claim 3, further comprising:
storing an indication that the set of VIFs are candidates for groupings based on the comparison, wherein generating of the flow entries is based on the indication.

6. The method of claim 3, further comprising:
determining a difference between the total number of flow entries corresponding to the grouping and the total number of flow entries corresponding to the other grouping based on the comparison to determine a merger profit corresponding to the set of VIFs; and
comparing the merger profit corresponding to the set of VIFs to a merger profit of another set of VIFs, wherein the generation of the flow entries is performed based on the comparison of the merger profits.

7. The method of claim 1, wherein grouping of the network addresses into non-overlapping groups comprises:
identifying non-overlapping network addresses that belong to at least one of the network addresses corresponding to the set of VIFs;
determining the service rules that correspond to the non-overlapping network addresses; and
grouping the non-overlapping network addresses based on the determination.

8. The method of claim 7, wherein grouping the non-overlapping network addresses comprises grouping the first network address and a second network address of the non-overlapping network addresses if a same service rule is determined to correspond to the first network address and the second network address.

9. The method of claim 7, wherein identifying non-overlapping network addresses comprises assigning an identifier to each of the non-overlapping network addresses, wherein the identifiers are used to generate the flow entries.

10. The method of claim 1, wherein the service rules are distributed firewall rules.

11. The method of claim 1, wherein each of the service rules corresponds to a source network address, and a destination network address.

12. The method of claim 1, wherein the network addresses are Internet Protocol (IP) addresses.

13. A non-transitory computer-readable medium having instructions stored thereon that when executed by a computing device cause the computing device to perform a method for managing service rules, the method comprising:
receiving a plurality of service rules for a set of virtual interfaces (VIFs) comprising a plurality of VIFs, wherein each service rule corresponds to at least one network address;
grouping the network addresses into non-overlapping groups of network addresses, wherein the grouping is performed over the plurality of service rules corresponding to the set of VIFs;
mapping the network addresses to the non-overlapping groups in a first data structure;
generating a set of flow entries corresponding to the plurality of service rules based on the non-overlapping groups;
receiving a packet comprising a first network address;
based on the first data structure, identifying a first non-overlapping group associated with the first network address;
based on the set of flow entries, determining a first service rule to apply to the packet based on the identified first non-overlapping group; and
applying the first service rule to the packet.

14. The non-transitory computer-readable medium of claim 13, wherein the set of VIFs comprise a first VIF and a second VIF, wherein the grouping is performed over the services rules corresponding to the first VIF and the second VIF.

15. The non-transitory computer-readable medium of claim 13, wherein the method further comprises:
performing another grouping of the network addresses into non-overlapping groups of network addresses, wherein the other grouping is performed over the service rules corresponding to each of the set of VIFs; and
comparing a total number of flow entries corresponding to the other grouping of network addresses to a total number of flow entries corresponding to the grouping of network addresses, wherein the flow entries are generated based on the comparison.

16. The non-transitory computer-readable medium of claim 15, wherein generating the flow entries based on the comparison comprises:
generating the flow entries based on the grouping of network addresses if the total number of flow entries corresponding to the grouping is less than the total number of flow entries corresponding to the other grouping.

17. The non-transitory computer-readable medium of claim 15, wherein the method further comprises:
storing an indication that the set of VIFs are candidates for groupings based on the comparison, wherein generating of the flow entries is based on the indication.

18. The non-transitory computer-readable medium of claim 15, wherein the method further comprises:
determining a difference between the total number of flow entries corresponding to the grouping and the total number of flow entries corresponding to the other grouping based on the comparison to determine a merger profit corresponding to the set of VIFs; and
comparing the merger profit corresponding to the set of VIFs to a merger profit of another set of VIFs, wherein the generation of the flow entries is performed based on the comparison of the merger profits.

19. The non-transitory computer-readable medium of claim 13, wherein grouping of the network addresses into non-overlapping groups comprises:

identifying non-overlapping network addresses that belong to at least one of the network addresses corresponding to the set of VIFs;

determining the service rules that correspond to the non-overlapping network addresses; and grouping the non-overlapping network addresses based on the determination.

20. An apparatus for managing service rules, comprising:

means for receiving a plurality of service rules for a set of virtual interfaces (VIFs) comprising a plurality of VIFs, wherein each service rule corresponds to at least one network address;

means for grouping the network addresses into non-overlapping groups of network addresses, wherein the grouping is performed over the plurality of service rules corresponding to the set of VIFs;

means for mapping the network addresses to the non-overlapping groups in a first data structure;

means for generating a set of flow entries corresponding to the plurality of service rules based on the non-overlapping groups;

means for receiving a packet comprising a first network address;

based on the first data structure, means for identifying a first non-overlapping group associated with the first network address;

based on the set of flow entries, means for determining a first service rule to apply to the packet based on the identified first non-overlapping group; and means for applying the first service rule to the packet.

* * * * *